(12) United States Patent
Moore

(10) Patent No.: US 8,603,278 B2
(45) Date of Patent: Dec. 10, 2013

(54) CONTAINER LABEL

(75) Inventor: Cherie Lynn Moore, Livermore, CA (US)

(73) Assignee: Cherie Lynn Moore, Livermore, CA (US)

( * ) Notice: Subject to any disclaimer, the term of this patent is extended or adjusted under 35 U.S.C. 154(b) by 39 days.

(21) Appl. No.: 13/030,880

(22) Filed: Feb. 18, 2011

(65) Prior Publication Data
US 2012/0211149 A1    Aug. 23, 2012

(51) Int. Cl.
*B32B 38/14*    (2006.01)

(52) U.S. Cl.
USPC ............. 156/219; 156/252; 156/277; 283/81; 206/459.1

(58) Field of Classification Search
None
See application file for complete search history.

(56) References Cited

U.S. PATENT DOCUMENTS

| | | | |
|---|---|---|---|
| 2,262,492 A | 11/1941 | Farrell | |
| 2,976,629 A | 3/1961 | Brixium et al. | |
| 4,759,139 A | 7/1988 | Ricks | |
| 4,901,457 A | 2/1990 | Chandler | |
| 5,301,802 A | 4/1994 | Nemeroff | |
| 5,329,713 A * | 7/1994 | Lundell | 40/310 |
| 5,358,770 A | 10/1994 | Evans | |
| 5,704,144 A | 1/1998 | Groth | |
| 6,086,702 A | 7/2000 | Rea | |
| 6,248,199 B1 * | 6/2001 | Smulson | 156/244.12 |
| 2009/0266735 A1 * | 10/2009 | Moore | 206/459.5 |
| 2010/0269382 A1 * | 10/2010 | Moore et al. | 40/330 |

* cited by examiner

*Primary Examiner* — Barbara J Musser

(57) ABSTRACT

Method for manufacturing container labels are presented, the container label having a blank name space, the blank name space configured for personalization of a container by writing a user's name or an identification on the blank name space, the method including: designing the container label, the container label having a first surface, where the container label includes a first surface, and where the container label includes graphics and the blank name space void of graphics on the first surface; printing the container label; applying a texture to the blank name space, where the texture provides a writable surface on the first surface; and permanently applying the container label to the container.

15 Claims, 4 Drawing Sheets

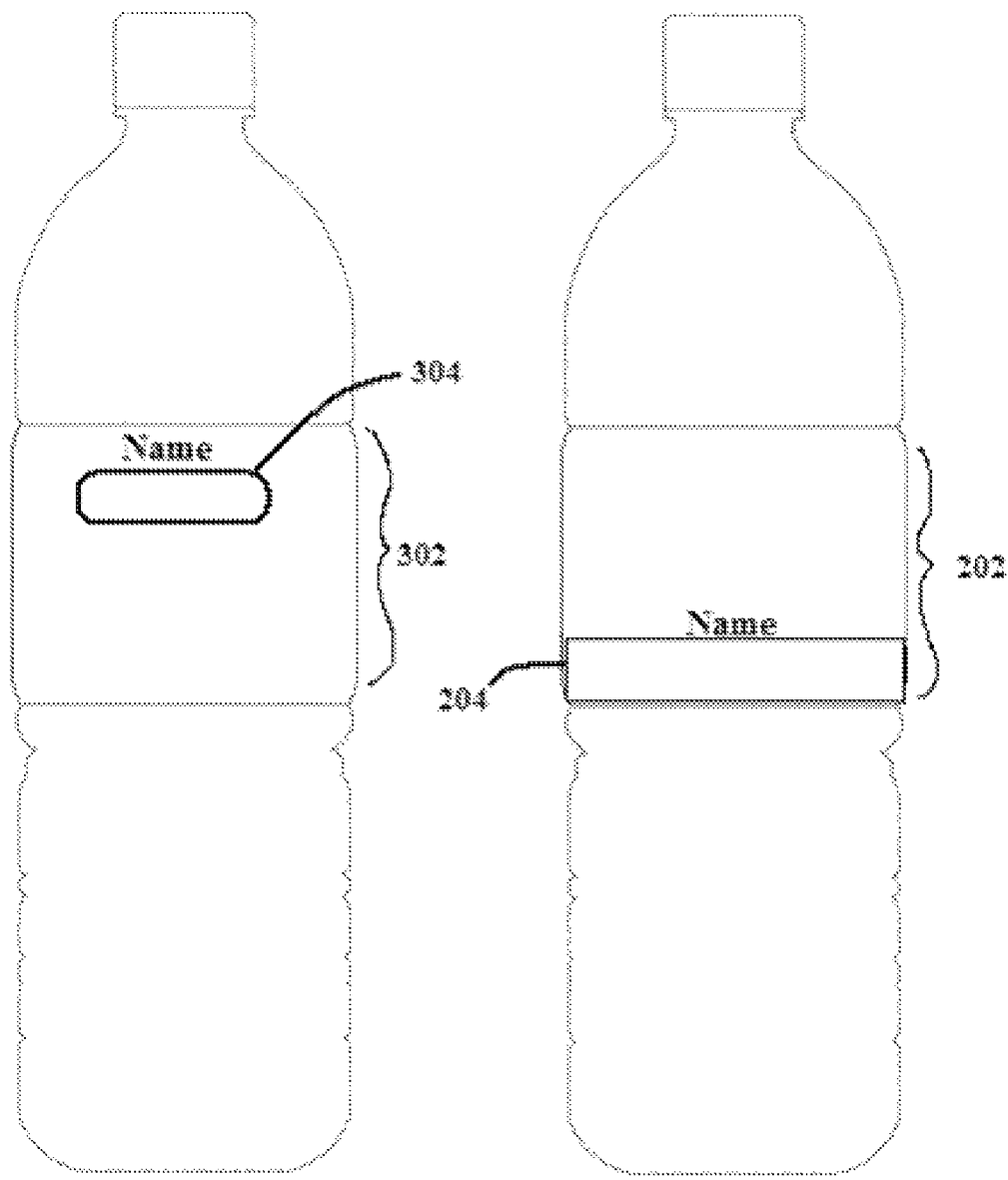

CONTAINER LABEL

CROSS REFERENCE TO RELATED APPLICATIONS

The present invention is a continuation-in-part of U.S. patent application Ser. No. 12/386,916 entitled "PERSONALIZABLE BEVERAGE BOTTLE NAME LABEL," filed on Apr. 24, 2009 herewith by the same inventor herein.

BACKGROUND

As disclosed herein, container label embodiments relate to improvements in the labeling of containers and primarily to an improved means by which containers, such as beverage containers and the like may be personalized for easy identification. Bottles and other beverage containers are utilized throughout the world. With growing concerns regarding the health and wellness of individuals utilizing such beverage containers, the need to identify one's own beverage container becomes increasingly important when mixed in with other beverage containers that may be identical or nearly identical.

For example, when two or more individuals set their beverage container (or other container) of like appearance in close proximity, it is often difficult or impossible to identify which bottle belongs to which individual. The result is that individuals may drink from one another's beverage container. This intermixing of beverage containers poses a potential health risk that may contribute to a spread of illness or disease.

Accordingly, it would be desirable to provide improved methods for personalizing an individual's container before the container has been intermixed with other containers of the same appearance.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Method for manufacturing container labels are presented, the container label having a blank name space, the blank name space configured for personalization of a container by writing a user's name or an identification on the blank name space, the method including: designing the container label, the container label having a first surface, where the container label includes a first surface, and where the container label includes graphics and the blank name space void of graphics on the first surface; printing the container label; applying a texture to the blank name space, where the texture provides a writable surface on the first surface; and permanently applying the container label to the container. In some embodiments, the applying a texture to the blank name space further includes: embossing a textured pattern to the blank name space, where the textured pattern is a pattern selected from the group consisting of: a uniform pattern and a random pattern and where the embossing is a process selected from the group consisting of: a stamping process, a thermal stamping process, an ultrasonic stamping process, a vibration stamping process, a rolling process, a thermal rolling process, an ultrasonic rolling process, a vibration rolling process, and a thermal process. In some embodiments, the applying a texture to the blank name space further includes: forming a writable surface layer on the blank name space, where the writable surface layer is adhered with the first surface, where the writable surface layer is solvent compatible with the first surface. In some embodiments, methods further include perforating the container label with a number of perforated shapes, where the perforated shapes are selectably removable from the container label, where the perforated shape is a shape selected from the group consisting of: a geometric shape, a non-geometric shape, a circle shape, a triangle shape, a square shape, a rectangle shape, a star shape, a pentagon shape, a hexagon shape, a trapezoid shape, a moon shape, an animal shape, a planetary shape, and a character shape. In some embodiments, methods further include watermarking the blank name space to indicate a designated use.

In other embodiments, methods for making a beverage label are presented, the beverage label having a blank name space, the blank name space configured for personalization of a beverage container by writing a user's name or an identification on the blank name space, the method including: designing the beverage label utilizing computer aided design tools, where the beverage label includes a first surface, and where the beverage label includes graphics and the blank name space void of graphics on the first surface; printing the beverage label; embossing a textured pattern to the blank name space, where the textured pattern provides a writable surface on the first surface, where the textured pattern is a pattern selected from the group consisting of: a uniform pattern and a random pattern, and where the embossing is a process selected from the group consisting of: a stamping process, a thermal stamping process, an ultrasonic stamping process, a vibration stamping process, a rolling process, a thermal rolling process, an ultrasonic rolling process, a vibration rolling process, and a thermal process; and permanently applying the beverage label to the beverage container.

In other embodiments, methods for making a beverage label are presented, the beverage label having a blank name space, the blank name space configured for personalization of a beverage container by writing a user's name or an identification on the blank name space, the method including: designing the beverage label utilizing computer aided design tools, where the beverage label includes a first surface, where the beverage label includes graphics and the blank name space void of graphics on the first surface, and where the blank namespace is delineated from the label by at least a border; printing the beverage label; and permanently applying the beverage label to the beverage container.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is an illustrative representation of a container label having a horizontally oriented blank name space in accordance with embodiments of the present invention;

FIG. 3 is an illustrative representation of a container label having a horizontally oriented blank name space in accordance with embodiments of the present invention;

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
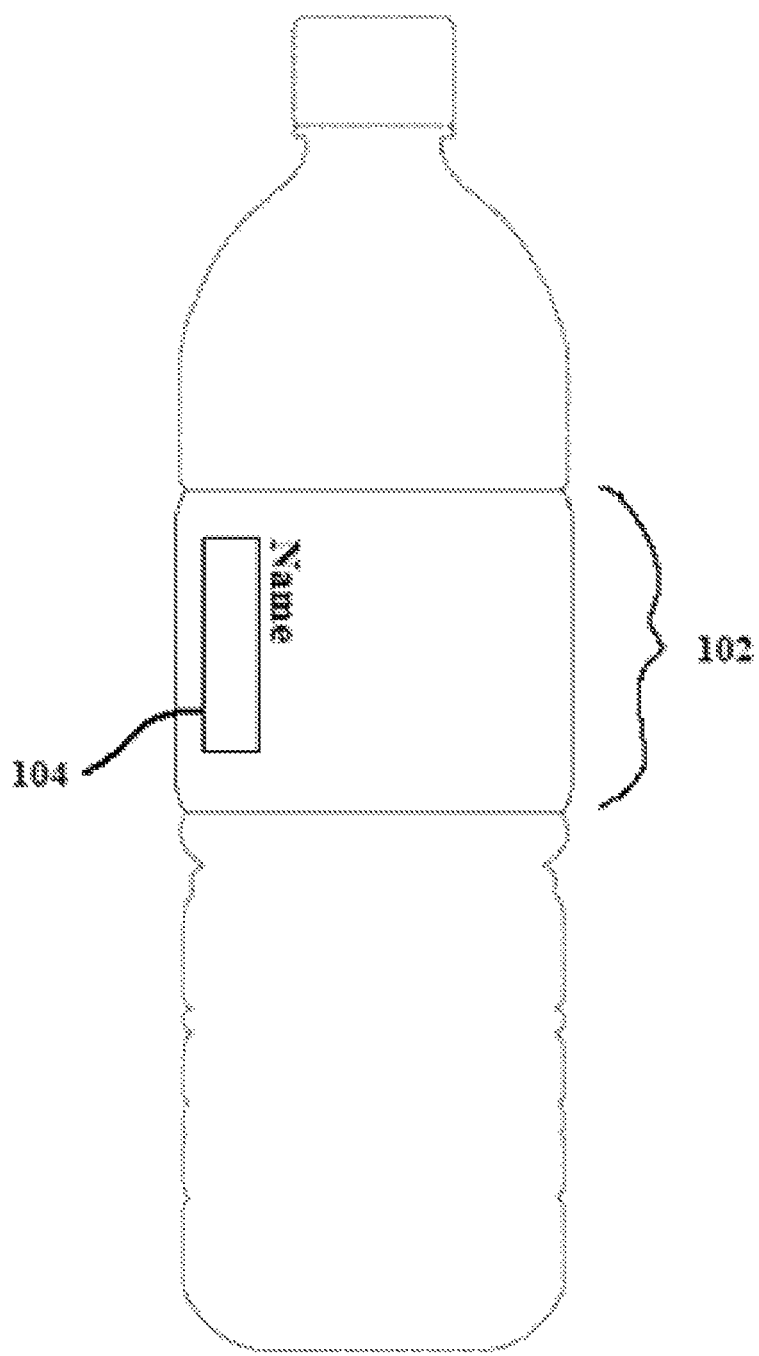
FIG. 1 is an illustrative representation of a container label having a vertically oriented blank namespace in accordance with embodiments of the present invention.

Referring now to the figures, particularly FIGS. 1-3 thereof illustrate embodiments of the present invention, a blank space of any size or shape may be located anywhere on a beverage label for the purpose personalizing the beverage label with, for example, name identification or other indication of ownership. Embodiments provide for beverage containers bearing a label with the capacity for identification using any writing instrument. Label embodiments include a name space that is added in the design and processing of any label design program and/or implementation in the process to the production of beverage bottle labels. Label space for personalization may be designed, processed, and assembled to any pre-existing label in any suitable or conventional manner of making.

A purpose of this invention allows anyone to be able to easily identify their own beverage container without unnecessary gimmicks or props. By providing easy identification, the spread of diseases or illnesses with potential for health risks may be minimized. Personalization of beverage containers particularly with containers of like size and appearance, promotes wellness for consumers of all ages.

Referring to FIG. 1, FIG. 1 is an illustrative representation of a container label 102 having a vertically oriented delineated blank name space 104 in accordance with embodiments of the present invention. In embodiments, container label 102 may include graphics (not illustrated) corresponding to information such as a name of the beverage, a name space identification, an itemization of ingredients, a company name, a barcode, and recycling information, which graphics may be printed or otherwise embossed on container label surface. In addition, container label 102 may further include blank name space 104, which is vertically oriented and which is void of graphics. In embodiments, blank name spaces may be of any size, strip length, or shape. In other embodiments, blank name space may be delineated by a border. In still other embodiments, blank name spaces may be designated as indicated by "name" in any language. In further embodiments, blank name spaces may be watermarked such that indicia are lightly printed in the blank name space to indicate a designated use of the space. In still further embodiments, container labels may be manufactured from any number of materials including a waterproof material, a waterproof paper material, a waterproof polymeric material, a writable material, a writable paper material, a writable polymeric material. It may be appreciated that the design of container labels disclosed herein may be accomplished utilizing computer aided design tools without departing from embodiments.

FIGS. 2 and 3 are illustrative representations of container labels (202, 302) having a horizontally oriented blank namespaces (204, 304) in accordance with embodiments of the present invention. In embodiments, container label (202, 302) may include graphics (not illustrated) corresponding to information such as a name of the beverage, a name space identification, an itemization of ingredients, a company name, a barcode, and recycling information, which graphics may be printed or otherwise embossed on container label surface. In addition, container label (202, 302) may further include blank name space (204, 304), which is horizontally oriented and which is void of graphics. In embodiments, blank name spaces may be of any size, strip length, or shape. In other embodiments, blank name space may be delineated by a border. In still other embodiments, blank name spaces may be designated as indicated by "name" in any language. In further embodiments, blank name spaces may be watermarked such that indicia are lightly printed in the blank name space to indicate a designated use of the space. In still further embodiments, container labels may be manufactured from any number of materials including a waterproof material, a waterproof paper material, a waterproof polymeric material, a writable material, a writable paper material, a writable polymeric material. It may be appreciated that the design of container labels disclosed herein may be accomplished utilizing computer aided design tools without departing from embodiments.

Figure 4:
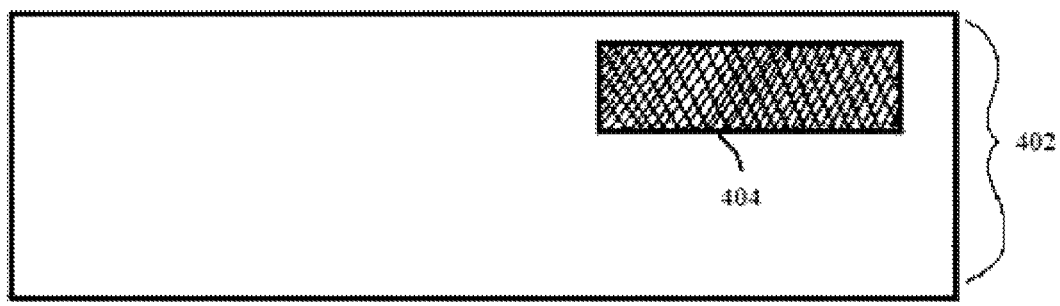
FIG. 4 is an illustrative representation of a container label having a writable surface in accordance with embodiments of the present invention.
Figure 5:
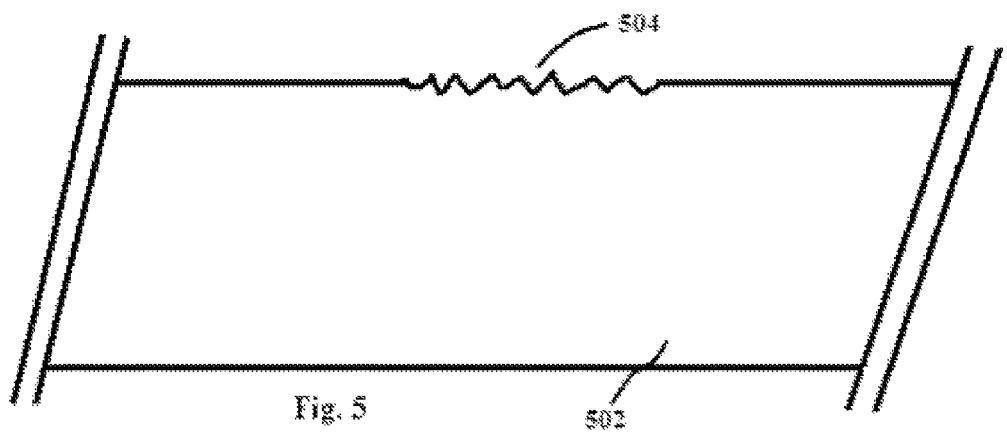
FIG. 5 is an illustrative representation of a magnified side view of a portion of a container label having a writable surface in accordance with embodiments of the present invention.

FIG. 4 is an illustrative representation of a container label 402 having a writable surface 404 in accordance with embodiments of the present invention. It may be appreciated that some container labels may be manufactured using materials which are not particularly receptive to writing. In some examples, container label material may be too smooth to allow deposition of ink or graphite from writing instruments. As such, embodiments may include a blank name space having a texture to provide a writable surface. In some embodiments, texture may be applied to a container label by an embossing process which may emboss a uniform pattern, a random pattern, or any combination pattern thereof. In some embodiments, embossing may be accomplished utilizing any number of processes including a stamping process, a thermal stamping process, an ultrasonic stamping process, a vibration stamping process, a rolling process, a thermal rolling process, an ultrasonic rolling process, a vibration rolling process, and a thermal process. In some embodiments embossing may be accomplished after printing of a container label. Referring briefly to FIG. 5, FIG. 5 is an illustrative representation of a magnified side view of a portion of a container label 502 having a writable surface 504 in accordance with embodiments of the present invention. In this illustrated example, writable surface 504 has been embossed with a random pattern. As may be seen a textured pattern "roughs" the surface of container label 502 which may provide a more write friendly surface in some embodiments.

In some embodiments, applying a texture to a blank name space may include forming a writable surface layer on the blank name space. For example, in one embodiment a writable surface composed of a solvent compatible compound may be deposited on and adhered with a container label surface. Solvent compatible compounds may include polymeric materials that are well-known in the art and may be utilized without limitation and without departing from embodiments disclosed herein.

Figure 6:
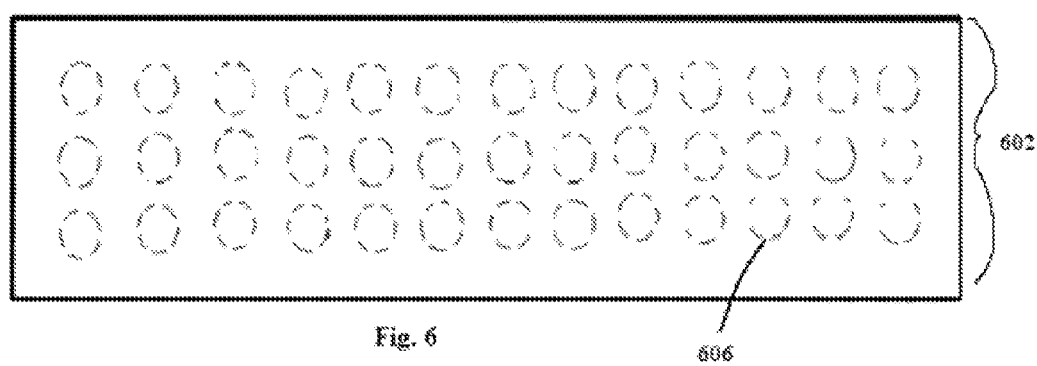
FIG. 6 is an illustrative representation of a container label having a plurality of perforations in accordance with embodiments of the present invention.

FIG. 6 is an illustrative representation of a container label 602 having a plurality of perforations 602 in accordance with embodiments of the present invention. By providing perforated shapes, a user may remove one or more of the shapes to individualize a container. Thus, embodiments are provided in which perforated shapes 606 may be selectably removable from the container label. In embodiments, perforated shapes may include any number of shapes including: a geometric shape, a non-geometric shape, a circle shape, a triangle shape, a square shape, a rectangle shape, a star shape, a pentagon shape, a hexagon shape, a trapezoid shape, a moon shape, an animal shape, a planetary shape, and a character shape.

Figure 7:
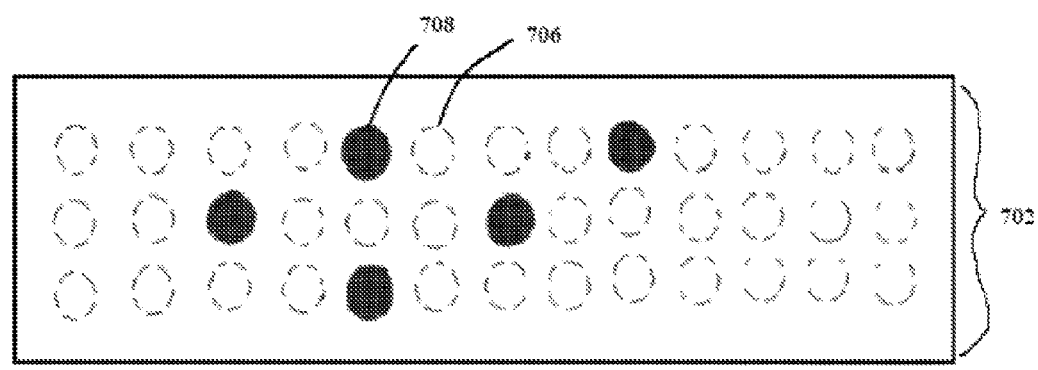
FIG. 7 is an illustrative representation of a container label having a plurality of perforations in accordance with embodiments of the present invention.

FIG. 7 is an illustrative representation of a container label 702 having a plurality of perforations 706 in accordance with embodiments of the present invention. In particular, FIG. 7 illustrates a container label having at least some of removed perforated shapes 708. Selectively removing one or more shapes in a memorable pattern may provide an easy method of identifying a container.

Methods of Manufacture

In embodiments, methods of manufacture may be utilized to provide container labels herein. For example, in one embodiment, a container label may be manufactured in accordance with the following steps, which steps are not limited to any particular order:

Step A: Designing a container label with graphics and a blank name space void of graphics;

Step B: Printing the container label;

Step C: Applying a texture to the blank name space to provide a writable surface on the container label; and Step D: Permanently applying the container label to a container.

In some embodiments, further steps may include any one or more of the following steps:

Step E: Embossing a textured pattern to the blank name space;

Step F: Forming a writable surface layer on the blank name space, such that the writable surface layer is adhered with the container label;

Step G: Perforating the container label with a plurality of perforated shapes, such that the perforated shapes are selectably removable from the container label; and Step H: Watermarking the blank name space to indicate a designated use.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for manufacturing a container label, the container label having a blank name space, the blank name space configured for personalization of a label for a container by writing a user's name or an identification on the blank name space, the method comprising:

designing the container label in CAD or a computer design program, wherein
the container label includes a first surface, and
includes at least graphics and the blank name space void of graphics on the first surface;

printing the container label; and permanently applying it to the container; and applying a texture and perforations to an area on the label, wherein the texture provides a writable surface on the first surface; and wherein the perforations completely surround an area so that the label extends beyond the perforations in all directions and wherein the area with perforations can then be removed and distinguish between said beverage users and labels.

2. The method of claim 1, wherein the applying a texture to the blank name space further comprises:
embossing a textured matte pattern on the surface of a label that is in the form of a blank space or area for one to personalize a beverage or product container.

3. The method of claim 2, wherein the textured pattern is a pattern selected from the group consisting of: a uniform pattern and a random pattern.

4. The method of claim 2, wherein the embossing is a process selected from the group consisting of: a stamping process, a thermal stamping process, an ultrasonic stamping process, a vibration stamping process, a rolling process, a thermal rolling process, an ultrasonic rolling process, a vibration rolling process, and a thermal process.

5. The method of claim 1, wherein the applying of a texture to the blank name space area further comprises:
forming a writable surface layer on the blank name space, wherein the writable surface layer is adhered with the first surface, wherein the writable surface layer is solvent compatible with the first surface.

6. The method of claim 5, wherein the writable surface layer is a polymeric material.

7. The method of claim 4, wherein the textured area of the blank name space can be designed as a square, a rectangle, oval, flower, heart, triangle, cloud, circle, star, or any other shape or color in which to easily write identification on.

8. The method of claim 1, wherein the container label is a material selected from the group consisting of: a waterproof material, a waterproof paper material, a waterproof polymeric material, a writable material, a writable paper material, a writable polymeric material.

9. The method of claim 1, wherein the step of designing of the container label utilizing CAD tools or other computer aided design tools, further comprises information selected from the group consisting of: a name of the beverage, a name space identification, an itemization of ingredients, a company name, a barcode, and recycling information.

10. The method of claim 1, wherein the blank name space is delineated from the label by at least a border.

11. The method of claim 1 further comprising: perforating the container label with a plurality of shapes surrounded by perforations, wherein the shapes surrounded by perforations are selectably removable from the container label.

12. The method of claim 11, wherein the shapes surrounded by perforations are selected from the group consisting of: a geometric shape, a non-geometric shape, a circle shape, a triangle shape, a square shape, a rectangle shape, a star shape, a pentagon shape, a hexagon shape, a trapezoid shape, a moon shape, an animal shape, a planetary shape, and a character shape.

13. The method of claim 1 further comprising: designing into the blank name space a watermarked area designated in which one can easily personalize.

14. A method for making a beverage label, the beverage label having a blank name space, the blank name space configured for personalization of a beverage container by writing a user's name or an identification on the blank name space, the method comprising:

designing the beverage label utilizing CAD or computer aided design tools, wherein
the beverage label includes a first surface, and wherein
the beverage label includes at least graphics and the blank name space void of graphics on the first surface;
printing the beverage label;
embossing a textured pattern to the blank name space, wherein the textured pattern provides a writable surface on the first surface, wherein
the textured pattern is a pattern selected from the group consisting of: a uniform pattern and a random pattern, and wherein
the embossing is a process selected from the group consisting of: a stamping process, a thermal stamping process, an ultrasonic stamping process, a vibration stamping process, a rolling process, a thermal rolling process, an ultrasonic rolling process, a vibration rolling process, and a thermal process; and
applying perforations to the label wherein the perforations completely surround an area so that the label extends beyond the perforations in all directions; and
permanently applying the beverage label to the beverage container.

15. A method for making a beverage label, the beverage label having a blank name space, the blank name space configured for personalization of a beverage container by writing a user's name or an identification on the blank name space, the method comprising:
designing the beverage label utilizing CAD or computer aided design tools, wherein
the beverage label includes a first surface, wherein
the beverage label includes at least graphics and the blank name space void of graphics on the first surface, and wherein
the blank namespace is delineated from the label by at least a border;
applying perforations to the label wherein the perforations completely surround an area so that the label extends beyond the perforations in all directions;
printing the beverage label; and
permanently applying the beverage label to the beverage container.

* * * * *